United States Patent
Ho

(10) Patent No.: US 9,356,904 B1
(45) Date of Patent: May 31, 2016

(54) EVENT INVITATIONS HAVING CINEMAGRAPHS

(71) Applicant: Google Inc., Mountain View, CA (US)

(72) Inventor: Denise Ho, Los Altos, CA (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/893,321

(22) Filed: May 13, 2013

Related U.S. Application Data

(60) Provisional application No. 61/646,883, filed on May 14, 2012.

(51) Int. Cl.
| | | |
|---|---|---|
| G06F 3/00 | (2006.01) | |
| H04L 12/58 | (2006.01) | |
| G06F 3/0484 | (2013.01) | |
| H04L 29/06 | (2006.01) | |
| G06F 3/0481 | (2013.01) | |
| G06F 3/0482 | (2013.01) | |

(52) U.S. Cl.
CPC .............. *H04L 51/32* (2013.01); *G06F 3/0484* (2013.01); *G06F 3/0481* (2013.01); *G06F 3/0482* (2013.01); *H04L 65/403* (2013.01)

(58) Field of Classification Search
CPC ... H04L 65/403; G06F 3/0482; G06F 3/0481; G06F 3/0484
USPC .................................................. 715/751–753
See application file for complete search history.

(56) References Cited

U.S. PATENT DOCUMENTS

| | | | | |
|---|---|---|---|---|
| 8,160,929 | B1* | 4/2012 | Park et al. ................... 705/26.1 |
| 2001/0049297 | A1* | 12/2001 | Hibscher et al. .................. 463/9 |
| 2002/0004755 | A1* | 1/2002 | Balthaser ........................ 705/26 |
| 2002/0049847 | A1* | 4/2002 | McArdle et al. .............. 709/227 |
| 2003/0046160 | A1* | 3/2003 | Paz-Pujalt et al. .............. 705/14 |
| 2006/0181411 | A1* | 8/2006 | Fast et al. ................. 340/539.13 |
| 2007/0162458 | A1* | 7/2007 | Fasciano ......................... 707/10 |
| 2007/0271340 | A1* | 11/2007 | Goodman et al. ............ 709/206 |
| 2008/0189620 | A1* | 8/2008 | Bonforte et al. .............. 715/751 |
| 2008/0291325 | A1* | 11/2008 | Teegan et al. ................. 348/552 |
| 2008/0304367 | A1* | 12/2008 | Forstall et al. ................. 368/28 |
| 2010/0030578 | A1* | 2/2010 | Siddique et al. ................ 705/3 |
| 2010/0251151 | A1* | 9/2010 | Alsbury et al. ............... 715/765 |
| 2011/0010305 | A1* | 1/2011 | Aleong et al. ................. 705/319 |
| 2011/0077861 | A1* | 3/2011 | Arrasvuori et al. ........... 701/207 |

(Continued)

OTHER PUBLICATIONS

Overview_of_the_scalable_video_coding—Sep. 2007.*

(Continued)

*Primary Examiner* — Tuyrtlien T Tran
(74) *Attorney, Agent, or Firm* — IP Spring

(57) ABSTRACT

A system and method for sending a message with a graphical theme that includes a cinemagraph to a member of a social network system are described. In one embodiment, the message includes an event invitation with a theme having a cinemagraph, where the message is sent from a member of the social network system to a group of invitees. In one embodiment, a system provides an event invitation interface that includes a theme selection through which an event invitation theme having a cinemagraph can be selected. The system sends the event invitation with the cinemagraph to a group of invitees selected by a member of the social network system, the invitees can include members or non-members of the social network system.

20 Claims, 8 Drawing Sheets

(56) References Cited

U.S. PATENT DOCUMENTS

| | | | |
|---|---|---|---|
| 2011/0264751 A1* | 10/2011 | Jans | 709/206 |
| 2011/0283195 A1* | 11/2011 | Brown | 715/738 |
| 2011/0314390 A1* | 12/2011 | Park et al. | 715/752 |
| 2012/0011450 A1* | 1/2012 | To | 715/752 |
| 2012/0102148 A1* | 4/2012 | Arolovitch et al. | 709/217 |
| 2012/0203707 A1* | 8/2012 | Hungerford et al. | 705/329 |
| 2013/0024901 A1* | 1/2013 | Sharif-Ahmadi et al. | 725/114 |
| 2013/0229581 A1* | 9/2013 | Joshi et al. | 348/584 |

OTHER PUBLICATIONS

HTML5—video tag—2011.*

Embedding a GIF—tutorials—2010.*

* cited by examiner

EVENT INVITATIONS HAVING CINEMAGRAPHS

FIELD

Embodiments relate generally to messaging in social network systems, and, more particularly, to an event invitation having a cinemagraph.

BACKGROUND

Social networks often permit members to create and distribute event invitations (and other types of messages) to other members in the social network and to people not in the social network. Event invitations can include basic information such as event type, date, time and location. Beyond the basic invitation information, an event invitation can have a graphical theme that may be related to the event or may simply be an arbitrary graphical theme for aesthetic purposes.

SUMMARY

One embodiment includes a method for creating and sending event invitation having a cinemagraph graphical theme. The method includes providing an event invitation interface for a social network system. The event invitation interface can include a theme selection through which an event invitation theme is selected from among a plurality of themes. The plurality of themes can include an event invitation theme having a cinemagraph. The cinemagraph can include one or more of a static image with mark-up language code for playing a video loop and an animated graphics interchange format file.

The method can also include obtaining a selection of the event invitation theme having the cinemagraph via the event invitation interface. The method can further include causing an event invitation with the event invitation theme having the cinemagraph to be sent to a group of members of the social network system. The group of members can include event invitees selected by a member of the social network system, wherein the event invitation is delivered to a plurality of interfaces for the social network system. Each interface corresponds to a member of the group of members, and each interface is adapted to operate on one of a desktop computer, a laptop computer, a tablet computer and a wireless communications device.

Another embodiment includes a method for creating a message having a cinemagraph. The method includes providing a message interface for a social network system. The message interface can have a message theme selection through which a message theme is selected from among a plurality of message themes, including a message theme having a cinemagraph. The method can also include obtaining a selection of the message theme having the cinemagraph via the message interface.

The method can further include causing a message with the message theme having the cinemagraph to be sent to a group of invitees including one or more members of the social network system and/or a non-member of the social network system.

The message interface can be an event invitation interface. The message can be an event invitation. The group of invitees can be event invitees selected by a member of the social network system.

The method can also include providing a preview of the message theme having the cinemagraph such that an animated portion of the cinemagraph is caused to be sent for display to a member of the social network system. The cinemagraph can include a static image and mark-up language code for playing a video loop and/or an animated graphics interchange format file.

The message can be delivered to a plurality of interfaces for the social network system, each interface corresponds to a member of the group of members, and each interface is adapted to operate on one of a desktop computer, a laptop computer, a tablet computer and a wireless communications device.

The cinemagraph can be dynamically altered based on a type of interface the message is being delivered to. The cinemagraph of the message can be sent as a calendar item to a calendar application such that an animated portion of the cinemagraph can be viewed when the calendar item is viewed.

One embodiment includes a system having a processor coupled to a computer readable storage medium, the computer readable storage medium having stored therein software instructions that, when executed by the processor, cause the processor to perform operations for creating and sending an event invitation with a cinemagraph. The operations can include providing a message interface for a social network system. The message interface can include a message theme selection through which a message theme is selected from among a plurality of message themes, including a message theme having a cinemagraph.

The operations can also include obtaining a selection of the message theme having the cinemagraph via the message interface. The operations further include causing a message with the message theme having the cinemagraph to be sent to a group of invitees including one or more members of the social network system and/or a non-member of the social network system.

The message interface is an event invitation interface and the message is an event invitation. The group of invitees can be event invitees selected by a member of the social network system. The cinemagraph can include one of a static image and mark-up language code for playing a video loop and an animated graphics file.

DETAILED DESCRIPTION

In one embodiment, a method includes sending a message with a graphical theme having a cinemagraph to a member of a social network system. A cinemagraph includes an image in which a portion of the image is animated, while the rest of the image remains static. The message can be an event invitation, or other message, with a theme having a cinemagraph, where the message is sent from a member of the social network system to a group of invitees that can include members and/or non-members of the social network system.

In one embodiment, a system can provide an event invitation interface that includes a theme selection through which a user (e.g., a member of the social network system) can select an event invitation theme from among a plurality of themes. The plurality of themes can include an event invitation theme having a cinemagraph. The system obtains a selection of the event invitation theme having the cinemagraph via the event invitation interface. The system sends the event invitation with the event invitation theme having the cinemagraph to a group of invitees selected by the member of the social network system, which can include other members of the social network system.

The system can provide a preview of the message theme having the cinemagraph such that an animated portion of the cinemagraph can be sent for display to the member of the social network system selecting the theme.

The cinemagraph can include a static image and mark-up language code (e.g., HTML 5 code) for playing a video loop. In another embodiment, the cinemagraph can include an animated graphics interchange format (GIF) file or other type of animated graphics file in any known or later developed format. The system can be adapted to provide the mark-up language cinemagraph or the graphics interchange format cinemagraph based on the type of device receiving the message or event invitation.

While embodiments are discussed herein in relation to an event invitation, it will be appreciated that the cinemagraph graphical theme could be applied to other message types within a social network system including, but not limited to, email messages, friend requests, tags, replies to other member postings, instant messages, direct messages, calendar invites, video chat invites and the like. Also, the cinemagraph graphical theme can be applied to profile pages, profile pictures or the like.

Figure 1:
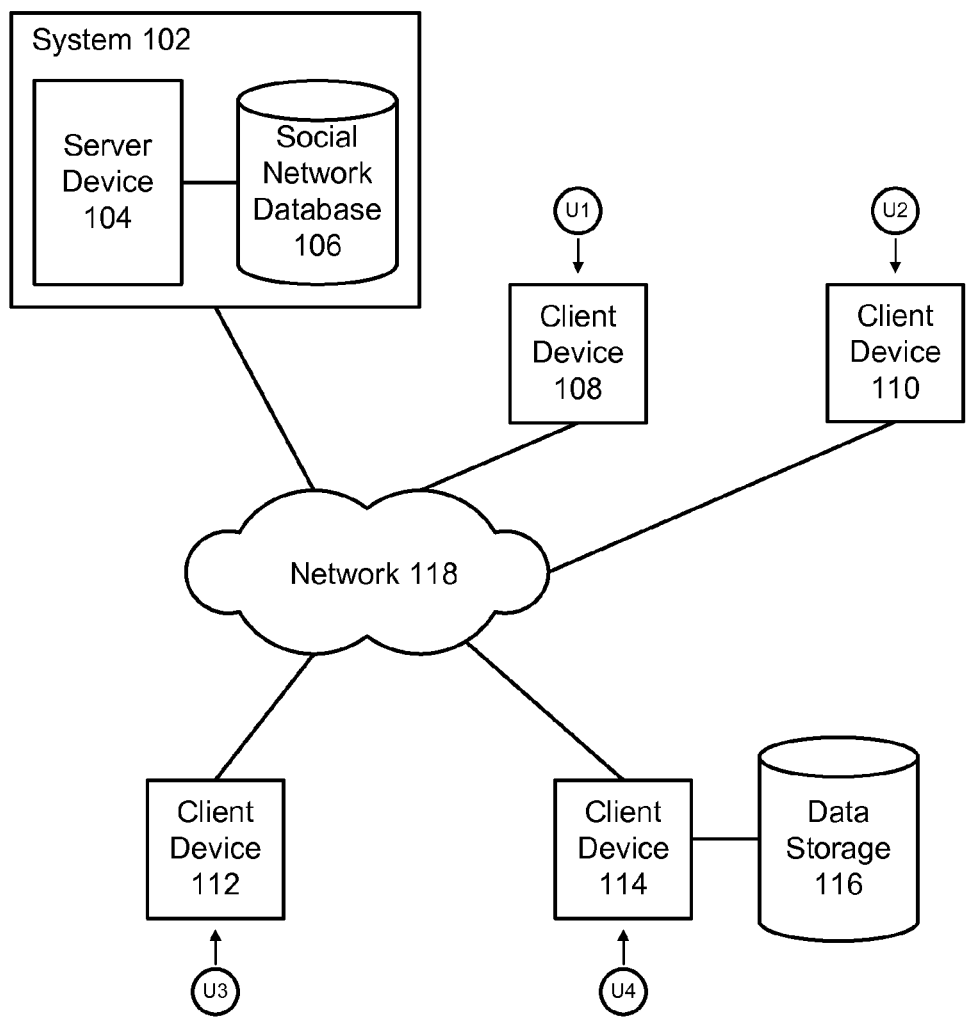
FIG. 1 is a diagram of an example social network system in accordance with at least one embodiment.

As shown in FIG. 1, a social network environment 100 includes a social network system 102 having a server device 104 and a social network database 106. One or more client devices (108-114) can access the social network system 102 via a network 118. A client device 114 can have a data storage device 116 attached.

In operation, a plurality of users (U1-U4) can access the social network system 102 via respective client devices (108-114). Users can create event invitations and send the invitations to other users in the social network system 102. The event invitations can be stored in the social network database 106. The social network database 106 can also store graphical themes for the event invitations including graphical themes having cinemagraphs. One or more files for each graphical theme can be stored in the social network database 106 and associated with an identifier for each graphical theme. The files can include mark-up language code, image files, style sheets or the like. The cinemagraphs can be stored in the social network database 106 or other storage system. The cinemagraphs can include image files (e.g., static images, video, animated images and the like) that can be stored in the social network database 106 and be associated with an identifier that corresponds to the graphical theme in which the cinemagraph is included.

For example, a user (U1) can create an event invitation having a cinemagraph in the social network system 102 and send the invitation to a group of invitees (e.g., users U2-U4). The creation and sending of event invitations with cinemagraphs is described in greater detail below in the descriptions of FIGS. 2-3. The group of invitees can include members of the social network system and non-members of the social network system.

When an invitee receives an event invitation having a cinemagraph via the social network system 102, the client device (e.g., 108-114) can make a request to receive the cinemagraph to display with the invitation. The social network system 102 can provide the cinemagraph corresponding to the invitation and can also alter the cinemagraph as needed based on the requesting device. Altering of the cinemagraph based on a request is described in greater detail below in the description of FIG. 8. The cinemagraph can include a static image and mark-up language code (e.g., HTML 5 video) for playing a video loop. For example, the first frame of video can be loaded as a static image while remaining video frames are loaded in the background. The loading of the video frames can be delayed until all other elements of the invitation have been loaded and displayed so that a user can at least view the invitation as a static image while the video frames for the cinemagraph are loading. The delaying of the video loading can be helpful when a user is receiving the invitation via a relatively low bandwidth connection, such as that provided by some wireless systems and some conventional wired networks access methods.

As an alternative, the cinemagraph can include an animated graphics interchange format (GIF) file or other type of animated graphics file in any known or later developed format. The system can be adapted to provide the mark-up language cinemagraph or the graphics interchange format cinemagraph based on the type of device receiving the message or event invitation.

Figure 2:
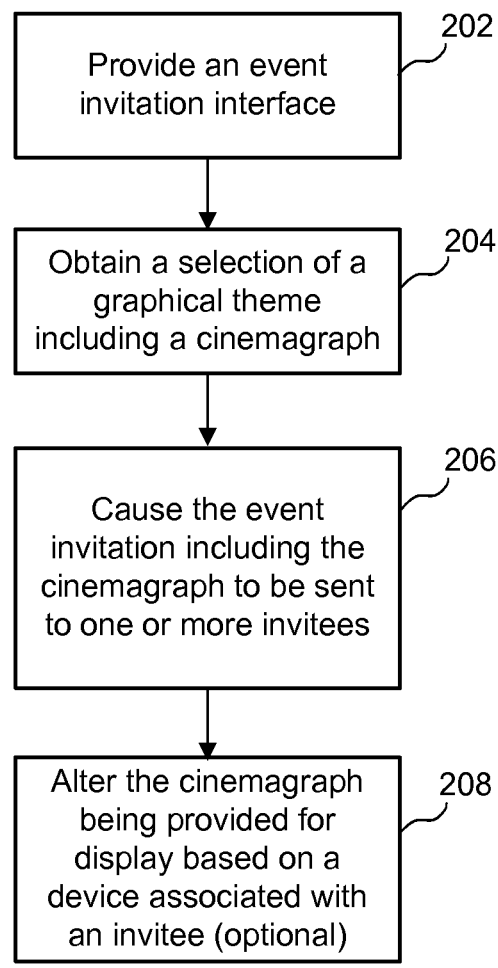
FIG. 2 is a flow chart of an example method for creating an event invitation having a cinemagraph in accordance with at least one embodiment.
Figure 3:
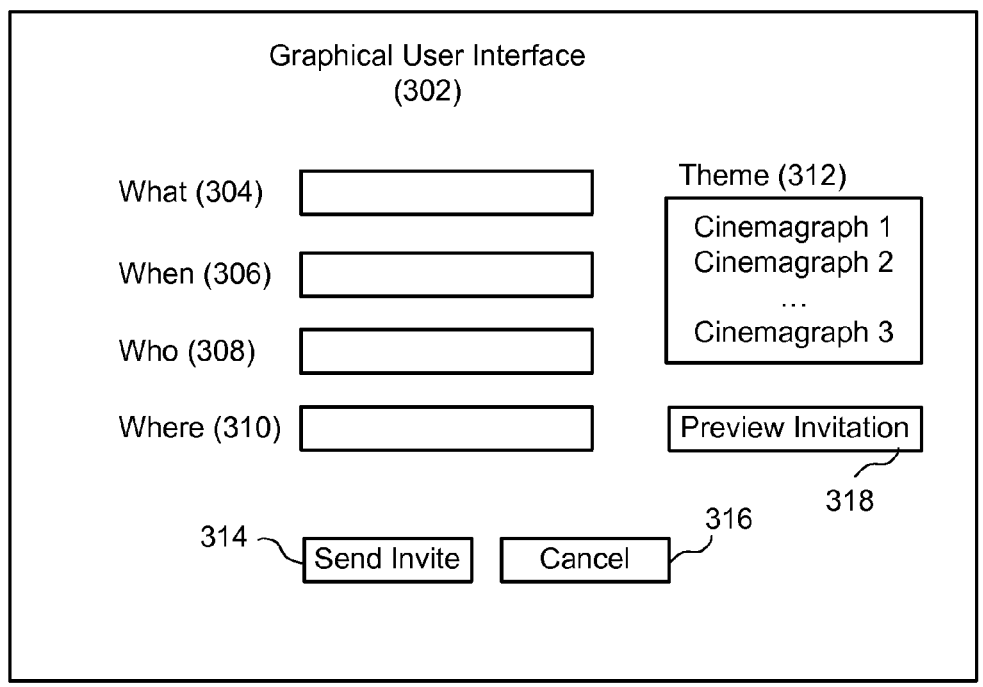
FIG. 3 is an example graphical user interface for creating an event invitation having a cinemagraph in accordance with at least one embodiment.

FIG. 2 shows an example method for creating and sending an event invitation having a cinemagraph. Processing begins at 202 where the system provides an event invitation interface. An example interface is shown in FIG. 3 and described below. The event invitation interface can include an element for selecting a graphical theme including a cinemagraph. The event invitation interface can also include an element for previewing an event invitation. The preview can show the selected cinemagraph. Processing continues to 204.

At 204, the system obtains a selection of a graphical theme including a cinemagraph. Processing continues to 206.

At 206, the system causes the event invitation to be sent to one or more invitees in response to input received from a user. For example, once the user has entered the invitation details (e.g., what, when, where and who) and selected a theme having a cinemagraph, the system can generate the invitation and send the invitation to the invitees indicated by the user. Processing continues to 208.

At 208, the system can optionally alter a cinemagraph being provided for display based on a device associated with an invitee. For example, where an invitee has received the invitation on a wireless phone and selects to view the invitation on the wireless phone. The system can provide the cinemagraph in accordance with limitations or constraints of the wireless device (e.g., communications bandwidth, screen size, browser capabilities, or the like). The altering of cinemagraphs is discussed in greater detail below in the description of FIG. 8 which expands on step 208. It will be appreciated that 202-208 can be repeated in whole or in part in order to accomplish a contemplated task.

FIG. 3 is an example graphical user interface (GUI) 302 for creating an event invitation having a cinemagraph. In particular, the GUI 302 includes user interface elements for obtaining event information such as what (304), when (306), who (308) and where (310) from a user.

The GUI 302 also includes a theme selection element (312) listing one or more themes such as cinemagraph themes that are selectable by a user. The GUI 302 also includes controls for sending the invitation (314), cancelling the invitation (316) and previewing the invitation (318).

Figure 4:
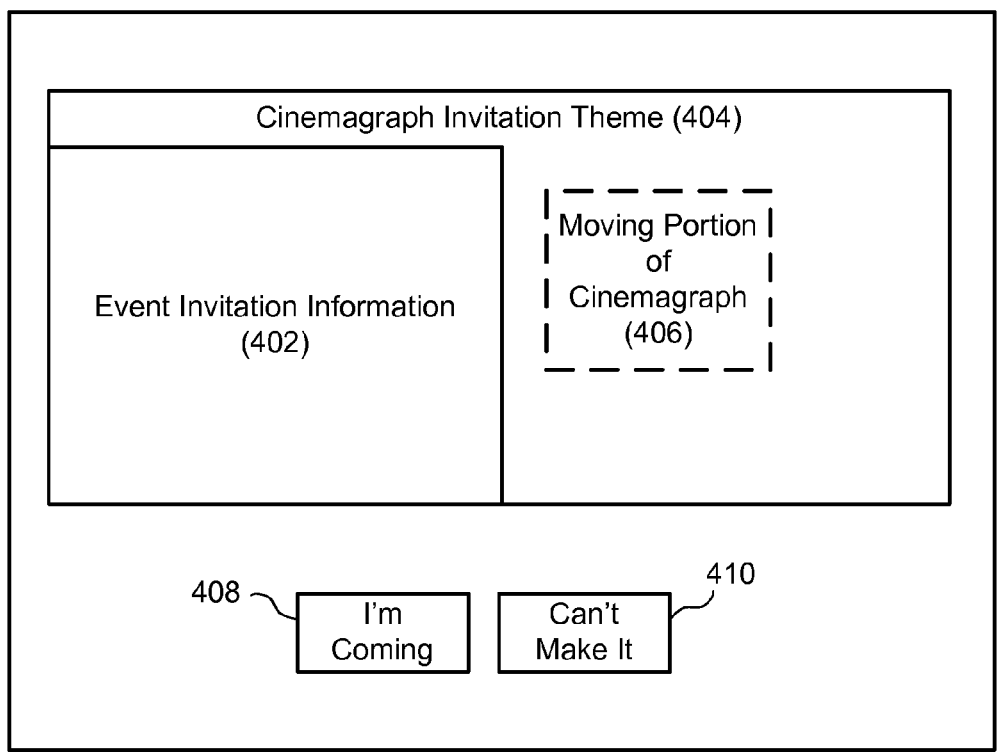
FIG. 4 is a diagram of an example event invitation in accordance with at least one embodiment.

An example of an event invitation 400 with a graphic theme having a cinemagraph is shown in FIG. 4. The event invitation 400 includes an event information section 402 listing event details such as what, when and where. The event invitation 400 also includes a cinemagraph invitation theme 404.

The cinemagraph invitation theme 404 includes a moving portion 406. The moving portion 406 represents the part of the image of the cinemagraph that appears to move. For example, in a cinemagraph of a steak on a grill, the steak and grill may be static images, while the flame below the steak may be the moving portion and the flame may appear to flicker when the cinemagraph is viewed. It will be appreciated that the moving portion 406 has been shown diagrammatically for illustration purposes. An actual implementation would likely include a moving portion having a shape corresponding to the moving elements. Further, there could be multiple moving portions in a cinemagraph.

The event invitation 400 can also include an element for indicating a user is planning to attend (408) or is not able to attend (410) the event.

Figure 5:
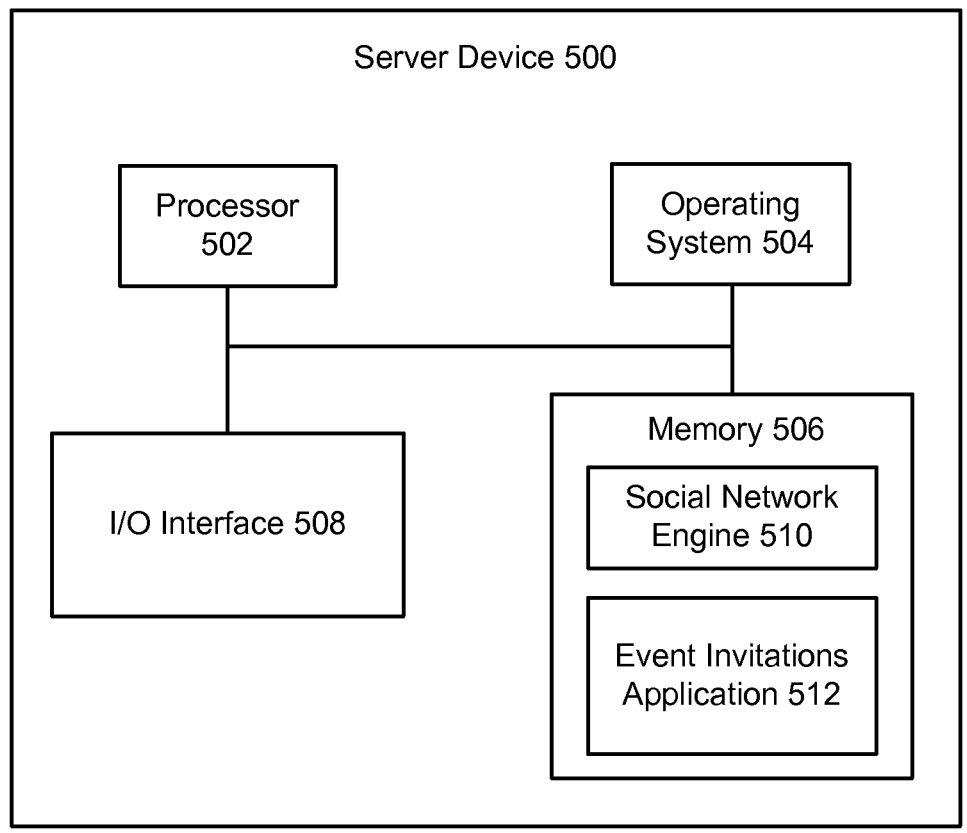
FIG. 5 is a diagram of an example server system in accordance with at least one embodiment.

FIG. 5 is a diagram of an example server device 500 that can be used to create, distribute and cause to be displayed an event invitation having a cinemagraph in a social network system in accordance with at least one embodiment. The server device 500 includes a processor 502, operating system 504, memory 506 and I/O interface 508. The memory 506 can include a social network engine 510 and an application program for event invitations including a feature for providing graphical themes having a cinemagraph 512.

In operation, the processor 502 may execute the application 512 stored in the memory 506. The application 512 can include software instructions that, when executed by the processor, cause the processor to perform operations for creating, sending and viewing event invitations having cinemagraphs in accordance with the present disclosure (e.g., performing one or more of steps 202-208 described above).

The application program 512 can operate in conjunction with the social network engine 510 and the operating system 504.

Event invitation themes with cinemagraphs can be provided by the social network system or supplied by social network members or third parties. Social network members may be able to vote on user submitted cinemagraph themes, with the most popular theme or themes being made available to the social network members via the event invitation interface.

Figure 6:
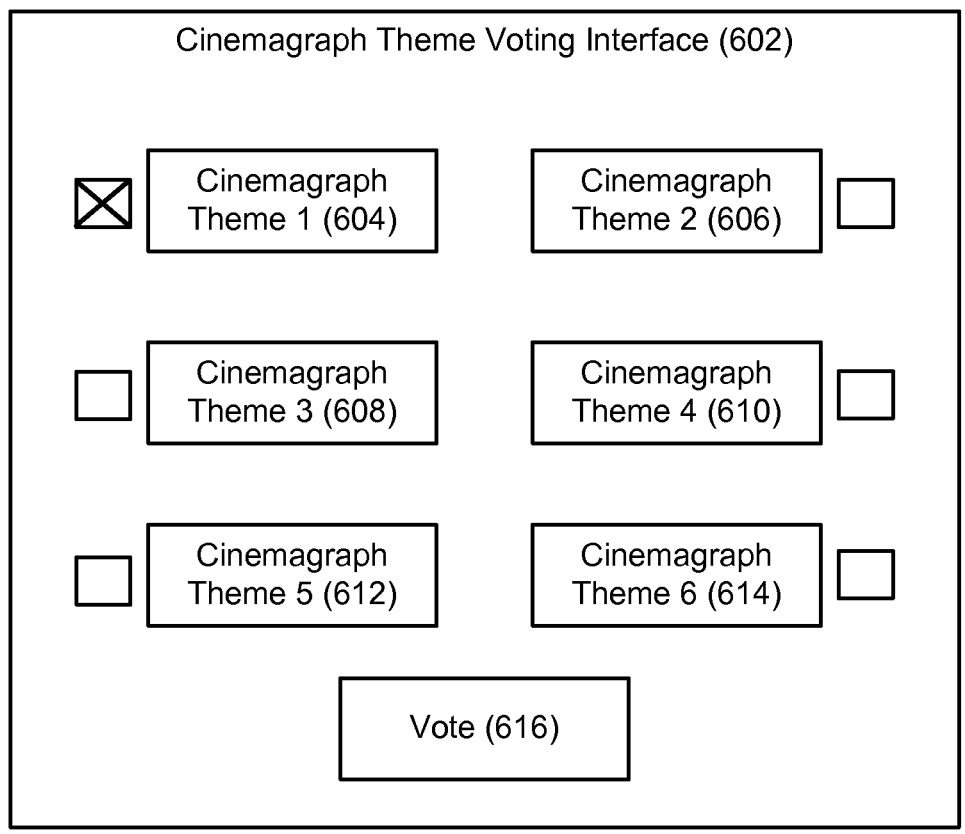
FIG. 6 is a diagram of an example interface for voting on event invitation themes in accordance with at least one embodiment.

FIG. 6 shows an example of an interface 602 for voting on cinemagraph event invitation themes. The interface 602 includes a plurality of cinemagraph themes 604-614. The cinemagraphs can be viewable within the voting interface or may be viewable by clicking on the cinemagraph and viewing in a separate window, section or tab. Each cinemagraph theme shown (604-614) has a corresponding selection element for allowing a user to select the cinemagraph theme. Once the user has selected a theme, in this example, the box adjacent to Cinemagraph Theme 1 (604) has been checked, the user can press the vote button (616) or equivalent to place a vote for the selected theme. The social network system can tally votes for the cinemagraph themes and make the most popular theme(s) available to the social network members via the event invitation interface.

Figure 7:
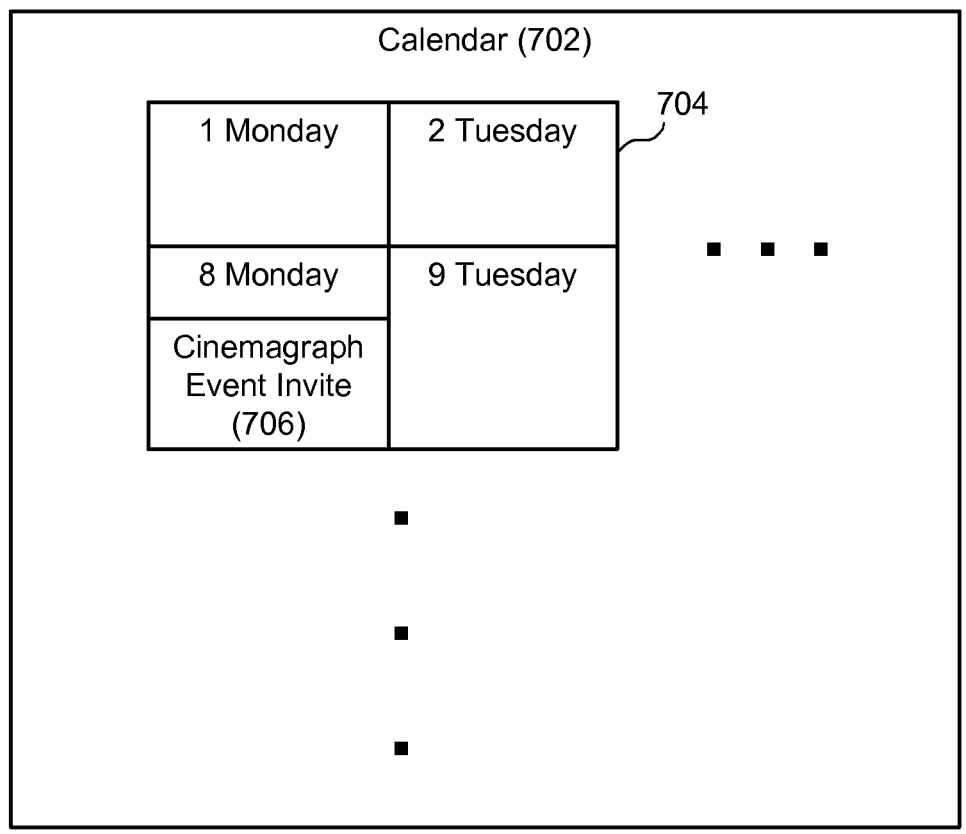
FIG. 7 is a diagram of an example calendar interface showing an event invitation theme having a cinemagraph in accordance with at least one embodiment.

Event invitations with cinemagraphs can be accepted and added to the calendar of an invitee. The calendar entry can show the cinemagraph when the invitee views his/her calendar. For example, FIG. 7 is a diagram showing a partial view of a calendar 702 having cells 704 corresponding to days of the month (or week if using a weekly view). In the cell for Monday the 8th, an event is shown with a cinemagraph event invitation 706 visible on the calendar. When the user views the calendar, the cinemagraph 706 is caused to be displayed. For example, a hover bubble for a calendar item can display the cinemagraph if one is associated with the calendar item.

Event invitations with cinemagraph themes can be viewed in different devices and browsers and can be viewed in different contexts. Different devices and browsers can have different constraints such as bandwidth limitations, screen size limitations, browser capability limitations and the like. Different contexts can also have various constraints, such as display area available.

In order to accommodate the differences in devices, browsers and contexts, the social network system may alter the cinemagraph being provided for display based on one or more constraints. By altering the cinemagraph, the system can help achieve a high quality experience within the limitations or constraints imposed by the device, browser or context.

Figure 8:
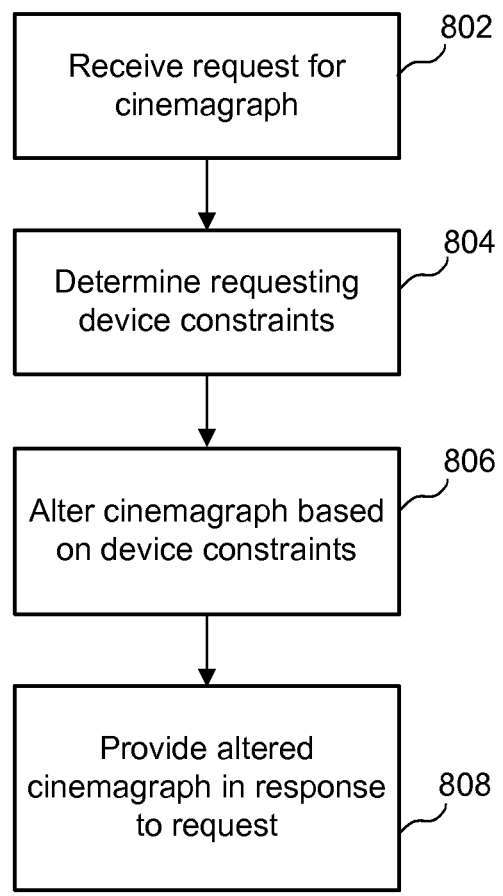
FIG. 8 is a flow chart showing an example method of dynamically altering an event invitation having a cinemagraph in accordance with at least one embodiment.

FIG. 8 shows details of step 208 from FIG. 2 discussed above. At 802, the system receives a request for a cinemagraph to be displayed. The request can include information such as device type, browser type, connection type, or the like. Processing continues to 804.

At 804, the system determines constraints associated with the request. Constraints can include, but are not limited to connection speed, browser capability, location, language, screen size, operating system capabilities and/or the like. While constraints are discussed regarding altering the cinemagraphs, it will be appreciated that the request information could indicate a device, browser or context that does not require any limitations and for which a full resolution version of the cinemagraph can be sent for display, for example. Processing continues to 806.

At 806, the cinemagraph is altered based on the constraints. For example, the cinemagraph size could be dynamically changed and/or the resolution could be changed based on the constraints. Also, the format of the cinemagraph can be altered based on the constraints. For example, a certain browser may not support HTML 5 video and therefore the system may send the cinemagraph in GIF format instead of HTML 5 video format to a client device having a browser that does not support HTML 5 video. Processing continues to 808, where the altered cinemagraph is provided in response to the request. The altered cinemagraph can be displayed on the user device.

The server (e.g., 104 and/or 500) can include, but is not limited to, a single processor system, a multi-processor system (co-located or distributed), a cloud computing system, or a combination of the above.

The client (or user, member or invitee) device can include, but is not limited to, a desktop computer, a laptop computer, a portable computer, a tablet computing device, a smartphone, a feature phone, a personal digital assistant, a media player, an electronic book reader, an entertainment system of a vehicle or the like.

The network can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal.

Moreover, embodiments of the disclosed method, system, and computer readable media can be implemented in software executed on a programmed general purpose computer, a special purpose computer, a microprocessor, or the like.

It is, therefore, apparent that there is provided, in accordance with the various embodiments disclosed herein, systems, methods and computer readable media for an event invitation having a cinemagraph.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A computer-implemented method performed by a processor, the method comprising:
   providing, by the processor, an event invitation interface for a social network system, the event invitation interface including a theme selection through which an event invitation theme is selected from among a plurality of themes, the plurality of themes including an event invitation theme having a cinemagraph, the cinemagraph including one or more of a static image with mark-up language code for playing a video loop and an animated graphics interchange format file;
   obtaining a selection of the event invitation theme having the cinemagraph via the event invitation interface; and
   sending an event invitation with the event invitation theme having the cinemagraph to a group of members of the social network system, the group of members including event invitees selected by a member of the social network system, wherein the event invitation is delivered to a plurality of interfaces for the social network system, each interface corresponding to a member of the group of members, and each interface being adapted to operate on one of a desktop computer, a laptop computer, a tablet computer and a wireless communications device, wherein sending the event invitation comprises, for each member of the group of members of the social network system:
      receiving, from the interface corresponding to the member, a request for the cinemagraph to be displayed, wherein the request includes information about the interface;
      determining, based at least in part on the information about the interface, one or more constraints associated with the request;
      in response to the request, dynamically altering the cinemagraph based on the one or more constraints to generate an altered cinemagraph that includes two or more video frames; and
      providing the event invitation to the interface corresponding to the member, the event invitation having the altered cinemagraph, wherein the altered cinemagraph is sent as a calendar item to a calendar application such that an animated portion of the cinemagraph can be viewed when the calendar item is viewed and wherein providing the event invitation comprises:
         sending an event information section of the event invitation and a first frame of the two or more video frames,
         receiving confirmation of receipt of the event information section and the first frame from the interface corresponding to the member, and
         upon receiving the confirmation of receipt, sending other frames of the two or more video frames.

2. A computer-implemented method performed by a processor, the method comprising:
   providing, by the processor, a message interface for a social network system, the message interface including a message theme selection through which a message theme is selected from among a plurality of message themes, the plurality of message themes including a message theme having a cinemagraph;
   obtaining a selection of the message theme having the cinemagraph via the message interface; and
   sending a message with the message theme having the cinemagraph to a group of invitees, wherein the message is delivered to a plurality of interfaces, each interface corresponding to a member of the group of invitees, wherein sending the message comprises, for each member of the group of invitees:
      receiving, from the interface corresponding to the member, a request for the cinemagraph to be displayed, wherein the request includes information about the interface;
      determining, based at least in part on the information about the interface, one or more constraints associated with the request;
      in response to the request, dynamically altering the cinemagraph based on the one or more constraints to generate an altered cinemagraph that includes a static image and one or more video frames; and
      providing the message to the interface corresponding to the member, the message having the altered cinemagraph, wherein the altered cinemagraph is sent as a calendar item to a calendar application such that an animated portion of the cinemagraph can be viewed when the calendar item is viewed and wherein providing the message comprises:
         sending a message section of the message and the static image,
         receiving confirmation of receipt of the message section, and
         upon receiving the confirmation of receipt, sending the one or more video frames.

3. The computer-implemented method of claim 2, wherein the constraint is based on a communications bandwidth.

4. The computer-implemented method of claim 2, wherein the group of invitees includes a non-member of the social network system.

5. The computer-implemented method of claim 2, wherein hovering over the calendar item causes the cinemagraph to be displayed.

6. The computer-implemented method of claim 2, wherein the message interface is an event invitation interface, and wherein the message is an event invitation.

7. The computer-implemented method of claim 2, wherein the message interface is an event invitation interface, the message is an event invitation, and the group of invitees are event invitees selected by a member of the social network system.

8. The computer-implemented method of claim 2, further comprising providing a preview of the message theme having the cinemagraph such that an animated portion of the cinemagraph is caused to be sent for display to a member of the social network system.

9. The computer-implemented method of claim 2, wherein the message theme having the cinemagraph includes the static image and a mark-up language code for playing a video loop.

10. The computer-implemented method of claim 2, wherein the message theme having the cinemagraph includes an animated graphics interchange format file.

11. The computer-implemented method of claim 2, wherein the plurality of interfaces are for the social network system, and wherein each interface is adapted to operate on one of a desktop computer, a laptop computer, a tablet computer and a wireless communications device.

12. The computer-implemented method of claim 11, wherein dynamically altering the cinemagraph includes modifying the cinemagraph based on a type of interface the message is being delivered to.

13. The computer-implemented method of claim 12, wherein modifying the cinemagraph based on the type of interface the message is being delivered to includes modifying at least one of a resolution of cinemagraph, a size of the cinemagraph, and a format of the cinemagraph.

14. A system comprising:
    a hardware processor coupled to a computer readable storage medium, the computer readable storage medium having stored therein software instructions that, when executed by the processor, cause the processor to perform operations including:
        providing a message interface for a social network system, the message interface including a message theme selection through which a message theme is selected from among a plurality of message themes, the plurality of message themes including a message theme having a cinemagraph;
        obtaining a selection of the message theme having the cinemagraph via the message interface; and
        sending a message with the message theme having the cinemagraph to a group of invitees, wherein the message is delivered to a plurality of interfaces, each interface corresponding to a member of the group of invitees, wherein sending the message comprises, for each member of the group of invitees:
            receiving, from the interface corresponding to the member, a request for the cinemagraph to be displayed, wherein the request includes information about the interface;
            determining, based at least in part on the information about the interface, one or more constraints associated with the request;
            in response to the request, dynamically altering the cinemagraph based on the one or more constraints to generate an altered cinemagraph that includes a static image and one or more video frames; and
            providing the message to the interface corresponding to the member, the message having the altered cinemagraph, wherein the altered cinemagraph is sent as a calendar item to a calendar application such that an animated portion of the cinemagraph can be viewed when the calendar item is viewed and
            wherein providing the message comprises:
                sending a message section of the message and the static image,
                receiving confirmation of receipt of the message section, and
                upon receiving the confirmation of receipt, sending the one or more video frames.

15. The system of claim 14, wherein the group of invitees includes one or more members of the social network system.

16. The system of claim 14, wherein the group of invitees includes a non-member of the social network system.

17. The system of claim 14, wherein the message interface is an event invitation interface.

18. The system of claim 14, wherein the message interface is an event invitation interface, and wherein the message is an event invitation.

19. The system of claim 14, wherein the message interface is an event invitation interface, the message is an event invitation, and the group of invitees are event invitees selected by a member of the social network system.

20. The system of claim 14, wherein the message theme having the cinemagraph includes one of the static image and mark-up language code for playing a video loop and an animated graphics file.

* * * * *